United States Patent
Wormsbaecher

(10) Patent No.: US 6,176,786 B1
(45) Date of Patent: Jan. 23, 2001

(54) TRIPOD UNIVERSAL JOINT ASSEMBLY

(75) Inventor: Hans Wormsbaecher, Lake Orion, MI (US)

(73) Assignee: GKN Automotive, Inc., Auburn Hills, MI (US)

(*) Notice: Under 35 U.S.C. 154(b), the term of this patent shall be extended for 0 days.

(21) Appl. No.: 09/138,629

(22) Filed: Aug. 24, 1998

(51) Int. Cl.$^7$ .................................................. F16D 3/26
(52) U.S. Cl. ................................................ 464/111
(58) Field of Search ............................... 464/111, 120, 464/125, 132

(56) References Cited

U.S. PATENT DOCUMENTS

| | | | |
|---|---|---|---|
| 1,172,964 | * 2/1916 | Evans | 464/120 |
| 3,930,378 | 1/1976 | Schmid . | |
| 4,384,860 | 5/1983 | Schmid . | |
| 5,728,004 | * 3/1998 | Dziegielewski | 464/125 X |

FOREIGN PATENT DOCUMENTS

| | | | |
|---|---|---|---|
| 2750854 | * 5/1978 | (DE) | 464/132 |
| 350954 | * 6/1905 | (FR) | 464/120 |
| 2141208 | * 12/1984 | (GB) | 464/111 |

* cited by examiner

Primary Examiner—Lynne H. Browne
Assistant Examiner—Greg Binda
(74) Attorney, Agent, or Firm—Mick A. Nylander

(57) ABSTRACT

A tripod universal joint assembly has a substantially annular outer race with three circumferentially distributed longitudinally extending, axis-parallel recesses. An inner joint member is disposed within the outer race and has three circumferentially distributed radial bores which define a centrally disposed cavity therebetween. A plurality of arm members each has a cylindrical body portion disposed in a respective radial bore and a head portion which projects from the inner joint member and engages a respective recess of the outer race. A spherical member is disposed in the cavity of the inner joint to maintain engagement of the head portion to the recess during articulation of the tripod universal joint. A plurality of annular bearing assemblies are each disposed between the cylindrical body portion of the arm member and its respective radial bore to provide a bearing contact surface for the radial and rotatable movement of each arm member with respect to its respective radial bore.

9 Claims, 1 Drawing Sheet

TRIPOD UNIVERSAL JOINT ASSEMBLY

TECHNICAL FIELD

This invention relates to an improved design for a tripod-type constant velocity universal joint.

BACKGROUND ART

Constant velocity universal joints are couplings used in automobiles to allow a rotational speed to be transmitted from a driving to a driven shaft which are not angularly aligned. One type of constant velocity universal joint commonly used in today's automobiles is the tripod universal joint. Tripod-type universal joints are characterized by a housing disposed around an inner joint which has a plurality of arms projecting therefrom for traveling in the grooves of the housing. A common feature of tripod universal joints is their plunging or end motion character. Plunging tripod universal joints allow the interconnection shafts to change length during operation and are currently the most widely used inboard (transmission side) joint in front-wheel drive vehicles.

The various types of tripod universal joints utilized today are often characterized by the different methods available for connecting or attaching tripod arms to the inner joint member. One variety of tripod joint exists in the art wherein a "spider" is splined to a drive shaft, the spider being an annular ring having three arms integrally formed thereon. At the upper portion of each arm, a trunnion is rotatably supported for riding in the grooves of the housing.

For background purposes, another method of tripod joint arm connection is shown by way of example in U.S. Pat. No. 4,384,860 ("the '860 patent") issued to Schmid. The '860 patent shows a constant velocity joint having a female joint half with three axial grooves. As disclosed therein, a trunnion is placed in each groove for making rolling contact against the sides of the grooves. Each trunnion has a turnpin for turningly supporting the rollers in a male joint half. It is this variety of tripod joint to which the teachings according to the present invention may be applied.

During articulation and angular movement of a constant velocity joint of the type disclosed in the '860 patent, movement of the joint components may result in sliding friction, particularly on the turnpins with respect to the male joint half. Further, due to the rotational movement of the turnpin in the male joint half, a constant velocity joint of this variety may sometimes experience noise, vibration and harshness, as well as shuddering, during operation. However, the '860 patent does not resolve these issues.

Consequently, an improved constant velocity joint design is desired for tripod joints having a female joint half, better known in the art as an outer joint or outer race, and a male joint half, which is commonly referred to in the art as an inner joint. This type of joint has trunnions which are supported within the male joint half. Such an improved design should seek to correct or alleviate any noise, vibration and harshness in this type of joint, as well as lessen any shuddering experienced during operation. Further, such an improved design should also reduce any sliding friction which may result from the radial movement and rotational movement of the turnpin with respect to the male joint half during operation.

BRIEF SUMMARY OF THE INVENTION

It is an object according to the present invention to provide a tripod constant velocity joint of the male and female joint halves variety which exhibits reduced or negligible noise, vibration and harshness characteristics during operation.

It is another object according to the present invention to provide a tripod constant velocity joint which exhibits reduced or negligible shuddering during operation.

It is a further object according to the present invention to provide a tripod constant velocity joint which exhibits reduced sliding friction as the turnpins, or arms, are slidingly and radially moved in the inner joint.

It is a still a further object according to the present invention to provide a tripod constant velocity joint which accommodates endwise movement within the joint itself with a minimum of frictional resistance since the arms are themselves supported on the inner joint by needle roller bearings.

In carrying out the above objects, features and advantages according to the present invention, the invention provides a tripod universal joint assembly having a substantially annular outer race with three circumferentially distributed and longitudinally extending recesses. These recesses are parallel to the longitudinal axis of the outer race. Further provided is an inner joint member disposed within the outer race which has three circumferentially distributed radial bores formed therein. These bores define a centrally disposed cavity therebetween. A plurality of arm members each having a cylindrical body portion is disposed in a respective radial bore. Each arm member has a head portion which projects from the inner joint member out of the bore for engaging a respective recess of the outer race. There is further provided in the tripod universal joint assembly a spherical member disposed in the cavity of the inner joint for maintaining engagement of the head portion to the recess during articulation of the tripod universal joint.

The tripod universal joint according to the present invention further includes a plurality of annular bearing assemblies, each being disposed between the cylindrical body portion of the arm member and its respective radial bore. Each annular bearing assembly provides a bearing contact surface for the radial and rotatable movement of each arm member with respect to its respective adjacent radial bore.

In a preferred embodiment, each roller assembly of the tripod universal joint includes a plurality of needle roller bearings which provide a bearing contact surface between the cylindrical body portion of the arm member and its respective adjacent radial bore. In another preferred embodiment, an annular cage is provided which supports the plurality of needle roller bearings.

In another embodiment, provided according to the present invention is a constant velocity tripod joint which has an outer joint with an inner surface having three circumferentially equispaced axis-parallel tracks. Also included is an inner joint which is disposed within the outer joint and has a star-shaped cross section. The inner joint has three radially extending bores and a centrally disposed cavity located therein. Further included is a plurality of arm members each disposed in a corresponding bore and having a head portion projecting therefrom. Each head portion engages a corresponding track of the outer joint. Each arm member is rotatably and radially movable relative to the inner joint.

A plurality of annular roller assemblies is included, each assembly being rotatably disposed on a corresponding arm. Each annular roller assembly includes a plurality of needle bearings which is supported by an annular cage. While the annular cage directly engages its respective bore, each plurality of needle bearings engages its respective arm member, thereby providing a bearing surface between the arm member and the bore. Moreover, there is also included a controlling member which is disposed in the cavity of the inner joint and controls the radial movement of each arm member. Preferably, the controlling member is a spherical body such as a ball. In still another embodiment, the head portion of each arm member is trunnion-like and, in other words, has a partial spherical exterior surface for engaging a corresponding track of the outer race. Still in another preferred embodiment, the inner joint has a shoulder portion formed therein for supporting each annular roller assembly in its corresponding bore.

The above objects and other objects, features and advantages of the present invention are readily apparent from the following detailed description of the best modes for carrying out the invention when taken in connection with the accompanying drawings wherein like reference numerals correspond to like components.

BEST MODE FOR CARRYING OUT THE INVENTION

Figure 1:
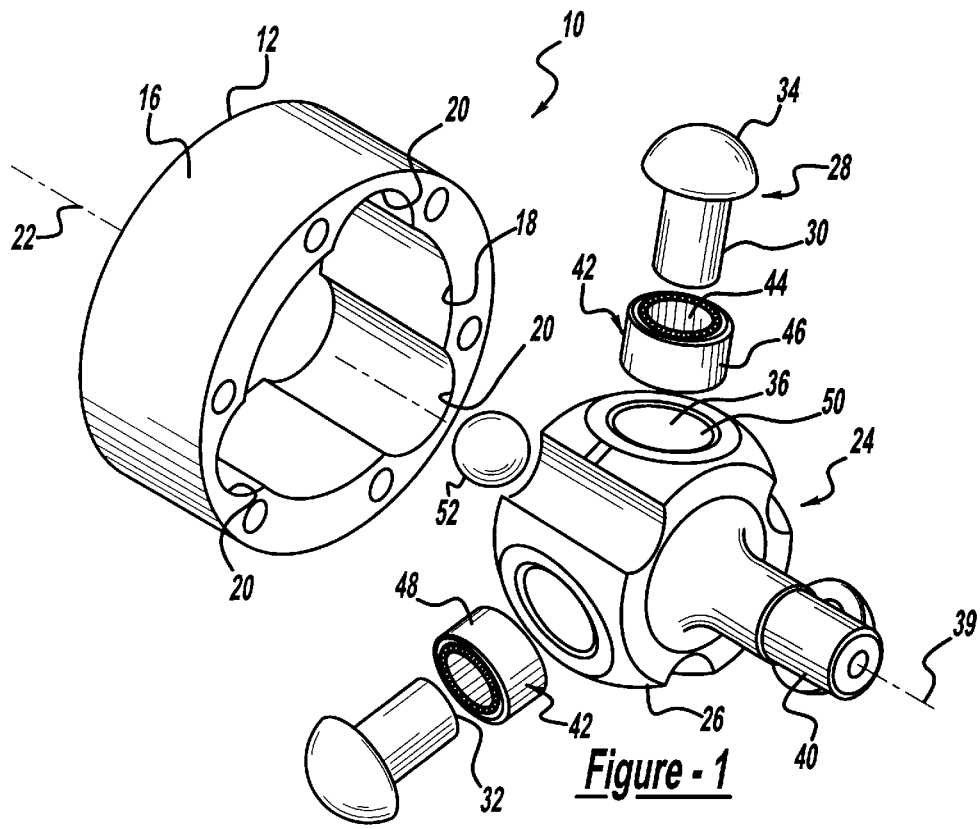
FIG. 1 is perspective view of the improved tripod con ant velocity universal joint according to the present invention.
Figure 2:
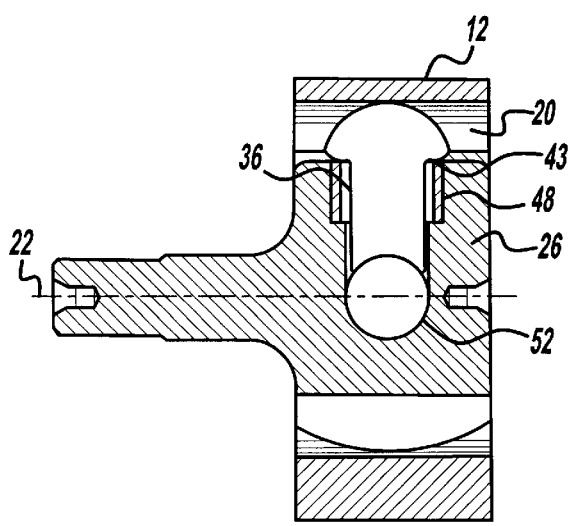
FIG. 2 is side cross-sectional view of the improved tripod constant velocity universal joint according to the present invention.
Figure 3:
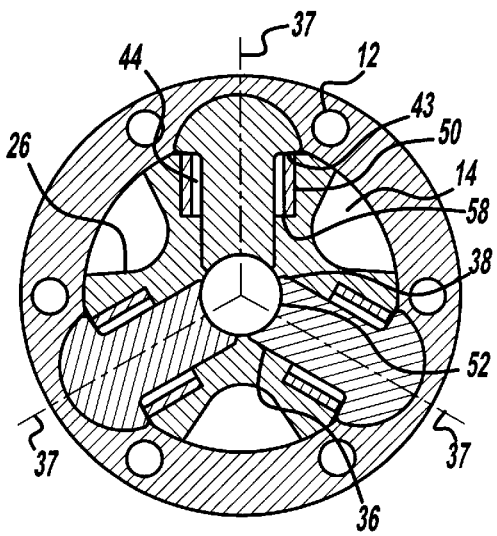
FIG. 3 is a top plan cross-sectional view of the improved tripod constant velocity universal joint according to the present invention.

In accordance with the teachings of the present invention, FIG. 1 shows a perspective view of a tripod-type constant velocity universal joint 10. Tripod constant velocity universal joint 10 is preferably of the plunging or telescopic variety. FIG. 2 is side cross-sectional view of tripod constant velocity universal joint 10 according to the present invention shown in FIG. 1. FIG. 3 is top cross-sectional view of the tripod constant velocity universal joint 10 shown in FIG. 1. Such joints 10 are typically used in such applications as inboard (transmission side) joints in front-wheel drive vehicles.

Tripod constant velocity universal joint 10 includes an annular outer race 12. Outer race 12 may include various features as is well-known in the art, such as having a bell-shaped housing. Outer race 12 defines a cavity 14 therewithin, and further has an outer surface 16 and an inner surface 18. Formed in inner surface 18 of outer race 12 are three longitudinal, equispaced and circumferentially distributed recesses 20 (or tracks). Outer race 12 is rotatable about a longitudinal axis 22, best shown in FIG. 2. Each recess 20 is longitudinally extending and is also generally parallel to longitudinal axis 22.

Further included in tripod constant velocity universal joint 10 is a substantially annular inner joint assembly 24 which includes an inner joint 26 having three circumferentially distributed arm members 28 disposed radially therein. As shown in FIG. 3, the cross-section of inner joint 26 is star-shaped. Each arm member 28 includes an outer portion 34 which projects radially from inner joint 26. As shown in FIG. 1, each arm member 28 typically has a cylindrical shaft portion 30 which has a flat radial inner end 32 and a head portion 34. Head portion 34 is partially-spherical (or trunnion-like).

More particularly, inner joint 26 has three circumferentially-distributed radial bores 36 formed as shown in FIGS. 1–3. Each bore 36 is generally offset by 120° and each is connected to the other bores 36 via an interior joint cavity 38. Each bore 36 is of course cylindrical and preferably of the counterbore variety, and will be discussed further herein. More particularly, cavity 38 is located at the intersection where each bore axis 37 meets or intersects with each other. As illustrated in FIGS. 2–3, cylindrical shaft portion 30 of each arm member 28 is disposed in a corresponding bore 36. Each bore axis 37 is oriented orthogonal to a longitudinal axis 39 of inner joint 26.

In an operative or assembled state, inner joint assembly 24 is centrally disposed within outer race 12, and particularly in cavity 14 of outer race 12. Inner joint assembly 24 further includes a drive shaft 40 mounted to inner joint 26. Drive shaft 40 may be integrally formed with inner joint 26 or formed separate therefrom and mechanically mounted to inner joint 26. When inner joint 26 is separate from shaft 40, it is typically secured by a spline and snap-ring (not shown) well-known in the art. FIG. 3 illustrates joint 10 in a non-articulated orientation, characterized by inner joint 26 being in-line with outer race 12 and having a longitudinal axis co-linear with that of longitudinal axis 22 of outer race 12. In this orientation, bore axis 37 is, of course, orthogonal to longitudinal axis 22. However, during an articulated condition (not shown) bore axis 37 is angled according to the degree of rotation and, of course, will not remain orthogonal to outer race axis 22.

As discussed, inner joint 26 has slidingly received therein three equally circumferentially spaced and radial arms 28. Particularly, inner joint 26 includes bores or counterbores 36 for receiving a corresponding arm 28. Head portion 34 of each arm 28 projects from inner joint 26 and is adapted to extend into a corresponding recess 20, as shown in FIGS. 2 and 3. Each cylindrical portion 30 of arm 28 is positioned within bore 36 of inner joint 26 in a rotatable and radially displaceable manner. Arm member 28 is positioned in sliding engagement with its corresponding bore 36 of inner joint 26.

To act as a bearing surface between each arm member 28 and bore 36, inner joint assembly 24 further includes a plurality of roller assemblies 42 disposed between each corresponding arm member 28 and bore 36. Still referring to FIGS. 1–3, each inner joint assembly 24 includes a plurality of roller assemblies 42. Each roller assembly 42 includes a plurality of needle roller bearings 44 surrounded and retained in position by an annular outer bearing cage 46. Needle roller bearings 44 provide a suitable bearing surface for cylindrical shaft 30 of arm 28 during operation when shaft 30 is rotatably moving on its axis. Outer bearing cage 46 has an outer surface 48 which operatively engages a corresponding bore 36 of inner joint 26. Roller assembly 42 is positioned in sliding and rotating engagement with the cylindrical exterior shaft portion 30 of arm 28.

To accommodate and retain the plurality of roller assemblies 42 without the use of snap rings, inner joint 26 has formed therein a plurality of counterbores as the bore 36 of choice. Thus, generally it may also be stated that inner surface 50 of bore 36 includes a shoulder 58 which supports roller assembly 42. Roller assemblies 42 are likewise held in position at the outer radial end by head portion 34 of arm member 28, which provides a shoulder 43 for preventing the release of roller assemblies 42 from their respective counterbores 36. The plurality of roller assemblies 42 are in rolling contact with inner surface 50 of bore 36 and shaft portion 30 of cylindrical arm 28.

As previously discussed, arm member 28 engagingly rides in recess 20. Longitudinal recess 20 traps head 34 in recess 20 and allows only movement of roller assembly 42 along a path which is generally parallel to axis 22. Skewing of roller assembly 36 relative to recess 20 is thus minimized. Of course, it is contemplated that each plurality of needle roller bearings 44 may be also be supported on a shoulder (not shown) formed on the outer surface of cylindrical portion 30 of arm 28. In the alternative, it is contemplated that both cylindrical arm 30 and bore 36 may each have a partial shoulder formed thereon for supporting roller assembly 42 therebetween. As previously mentioned, cylindrical arm 28 is in sliding contact with bore 36.

With joint 10 rotating in the articulated condition, there occurs, with reference to inner joint assembly 24, a radially oscillating movement of head portion 34 relative to joint axis 22 and pivoting movement of head portion 34 on arm member 28. At the same time, with reference to outer race 12, there occurs longitudinally extending oscillating rolling movement of arm members 28 along recesses 20. The first mentioned radial and pivoting movements are accompanied by sliding friction which is alleviated and/or abated through use of roller assemblies 42 disposed between cylindrical portion 30 of arm member 28 and bore 36. Again, cylindrical portion 30 or arm member 28 uses roller assemblies 42 as a bearing surface to axially and rotatably move relative to inner joint 26.

Roller assembly 42 uses needle rollers 44 as a bearing surface to move relative to arm 28. When joint 10 rotates in the articulated condition, there occurs, with reference to inner race 26, a radially oscillating movement of roller assembly 42 relative to joint axis 22 and pivoting movement of roller assembly 42 on arms 28. At the same time, with reference to outer race 12, there occurs longitudinally extending oscillating rolling movement of roller assembly 42 along recesses 20. The first mentioned radial and pivoting movements are accompanied by sliding friction. The next mentioned rolling movement predominantly occurs in the form of rolling contact movement. Tripod constant velocity universal joint 10 accommodates endwise movement within the joint itself with a minimum of frictional resistance since arms 28 are themselves supported in inner joint 26 by roller assembly 42. Thus, through the application of roller assembly 42 circumferentially surrounding cylindrical body portion 34 of arm 28, noise, vibration and harshness may be reduced, as well as shuddering and sliding friction during the normal course of operation of constant velocity joint 10.

Further disposed within cavity 38 of inner joint 26 is a spherical member 52 (shown as a ball member in FIGS. 1–3). Spherical member 52 is provided therein for maintaining the position of head portion 34 of cylindrical arm 28. Particularly, during articulation of tripod constant velocity universal joint 10, spherical member 52 applies force against end portion 32 of each arm 28 causing head portion 34 to ride in their respective recesses or tracks 20. As shown in FIGS. 2 and 3, end portion 32 may be shaped to mate with the shape of spherical member 52.

It is understood, of course, that while the forms of the invention herein shown and described include the best mode contemplated for carrying out the present invention, they are not intended to illustrate all possible forms thereof. It will also be understood that the words used are descriptive rather than limiting, and that various changes may be made without departing from the spirit or scope of the invention as claimed below.

What is claimed is:

1. A tripod universal joint assembly comprising:
   a substantially annular outer race with three circumferentially distributed longitudinally extending, axis-parallel recesses;
   an inner joint member disposed within the outer race having three circumferentially distributed radial bores defining a centrally disposed cavity therebetween;
   a plurality of arm members each having a cylindrical body portion disposed in a respective radial bore and a head portion projecting from the inner joint member and engaging a respective recess of the outer race;
   a spherical member disposed in the cavity of the inner joint for maintaining engagement of the head portion to the recess during articulation of the tripod universal joint; and
   a plurality of annular bearing assemblies, each annular bearing assembly disposed between the cylindrical body portion of the arm member and its respective radial bore for providing a bearing contact surface for the radial and rotatable movement of each arm member with respect to its respective radial bore wherein each annular bearing assembly includes a plurality of needle roller bearings for providing a bearing contact surface between the cylindrical body portion of the arm member and its respective bore.

2. The tripod universal joint assembly of claim 1 wherein each annular bearing assembly includes an annular cage for supporting the plurality of needle roller bearings.

3. A tripod-type constant velocity universal joint comprising:
   an annular outer joint member having an inner surface with three circumferentially distributed axis-parallel recesses formed therein;
   an inner joint member disposed within the outer race and including three evenly circumferentially distributed radial counterbores, each counterbore operatively corresponding to an adjacent axis-parallel recess of the outer joint member and including a shoulder portion, the inner joint member further including an opening centrally disposed at the intersection of each counterbore axis;
   a plurality of arm members each having a cylindrical shaft slidably received by a corresponding counterbore and rotatably supported therein, the shaft having a flat radial inner end, each arm member further including a trunnion head attached to a radial outer end of the shaft and projecting from the counterbore for engaging an adjacent axis-parallel recess of the outer joint member;
   a plurality of annular rollers, each receiving a corresponding shaft of the arm member and supported on the shoulder of an adjacent counterbore, each annular roller for providing a rolling contact bearing support for each shaft relative to the inner joint, each annular roller including a plurality of needle roller bearings disposed within a caged bearing member; and
   a spherical member disposed in the opening of the inner joint member for controlling the radial displacement of each arm member during articulation of the inner joint with respect to the outer race.

4. A constant velocity tripod universal joint comprising:
   an outer joint having an inner surface with three circumferentially equispaced axis-parallel tracks;
   an inner joint disposed within the outer joint having three radially extending bores and a centrally disposed cavity formed therein;

a plurality of arm members each disposed in a corresponding bore and having a head portion projecting therefrom for engaging a corresponding track of the outer joint, each arm member rotatably and radially movable relative to the inner joint;

a plurality of annular roller assemblies each rotatably disposed on a corresponding arm and including a plurality of needle bearings supported by an annular cage, wherein the annular cage directly engages its respective bore and each plurality of needle bearings engages its respective arm member for providing a bearing surface between the arm member and the bore; and a controlling member disposed in the cavity of the inner joint for controlling the radial movement of each arm member.

5. The constant velocity tripod joint of claim 4, wherein the head portion of each arm member has a partial spherical exterior surface for engaging its corresponding track of the outer race.

6. The constant velocity tripod joint of claim 4, wherein the inner joint has a shoulder portion formed therein for supporting each annular roller assemblies in its respective bore.

7. The constant velocity tripod joint of claim 4, wherein the controlling member is a spherical body.

8. The constant velocity tripod joint of claim 4, wherein the inner joint has a star-shaped cross section.

9. The constant velocity tripod joint of claim 4, wherein the bore is of the counterbore type.

* * * * *